United States Patent [19]

Takada

[11] 3,740,000

[45] June 19, 1973

[54] SAFETY BELT MECHANISM
[75] Inventor: Takezo Takada, Hikone, Japan
[73] Assignee: Takata Kojyo Co., Ltd., Tokyo, Japan
[22] Filed: July 12, 1971
[21] Appl. No.: 161,682

[52] U.S. Cl. .................. 242/107.4, 200/61.58 SB
[51] Int. Cl. ............................................ A62b 35/00
[58] Field of Search ................ 242/107 R, 107 SB, 242/107.4, 107.5, 107.6, 107.7; 297/388, 389; 280/150 SB; 244/122; 200/61.58 SB

[56] References Cited
UNITED STATES PATENTS
2,708,966   5/1955   Davis ................... 242/107.4 UX
2,825,581   3/1958   Knight ................. 242/107.4 X
3,308,902   3/1967   Carter ................. 242/107.4 X
3,489,367   1/1970   Kovacs et al. ........... 242/107.4

Primary Examiner—Werner H. Schroeder
Attorney—Stanley Wolder

[57] ABSTRACT

An automatic locking safety belt takeup reel includes a U-shaped bracket supporting a spring biased belt rewind reel having ratchets at opposite ends and a shaft supported by the bracket carries pawls movable into and out of engagement with the ratchets with the rocking of the shaft. A solenoid mounted on the bracket cross-piece actuates an armature connected by a lost motion link to a crank arm on the shaft. The solenoid is connected to a voltage source through an inertia or attitude sensing switch to energize the solenoid and lock the reel by the pawl and ratchet engagement open tilting or rapid deceleration of the vehicle mounting the switch.

4 Claims, 6 Drawing Figures

INVENTOR.
TAKEZO TAKADA
BY Stanley Wolder
ATTORNEY

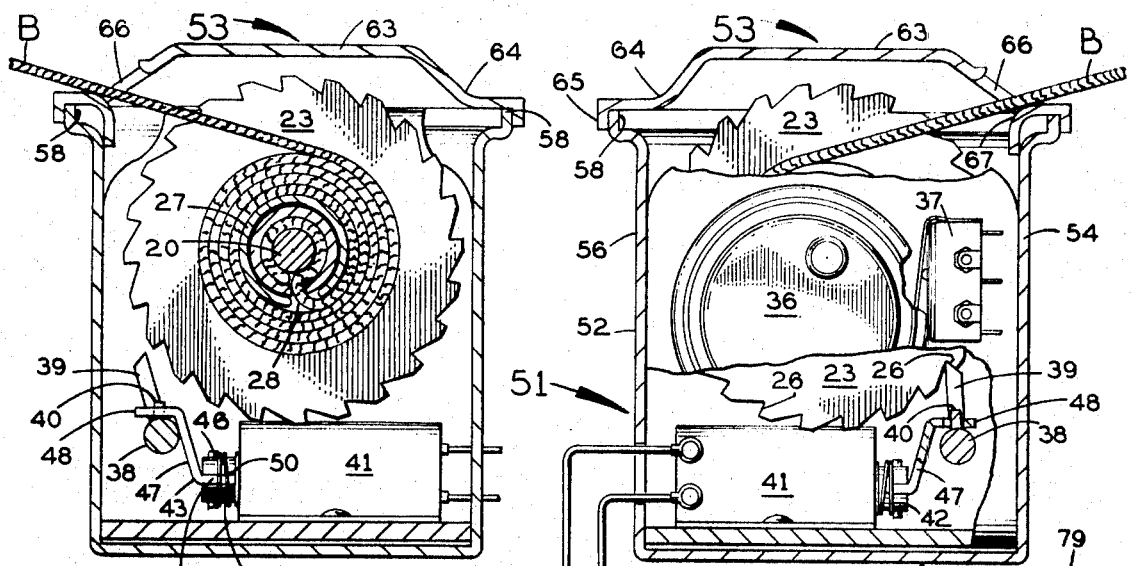
FIG. 4
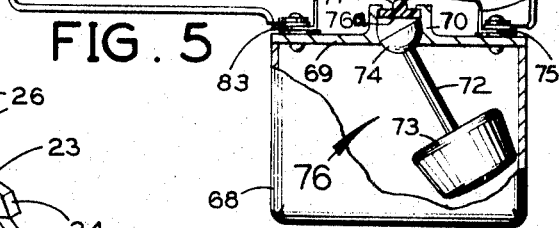
FIG. 5
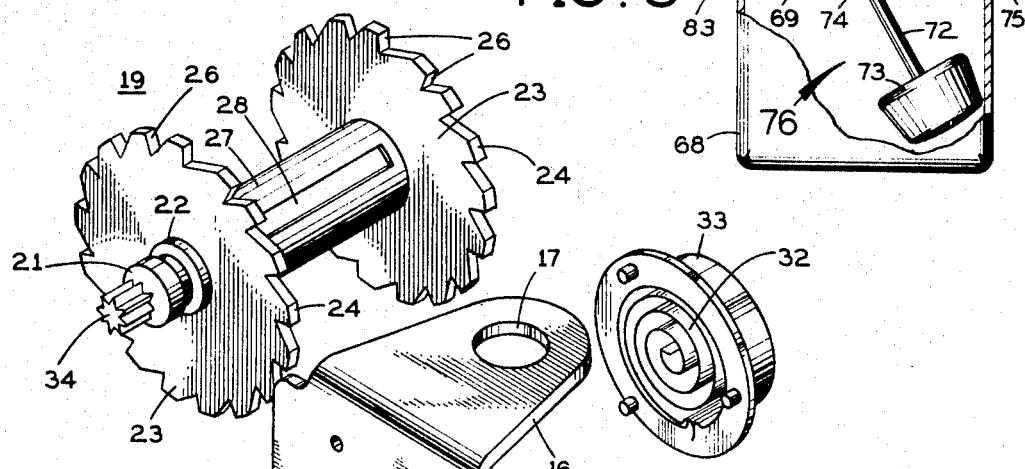
FIG. 6
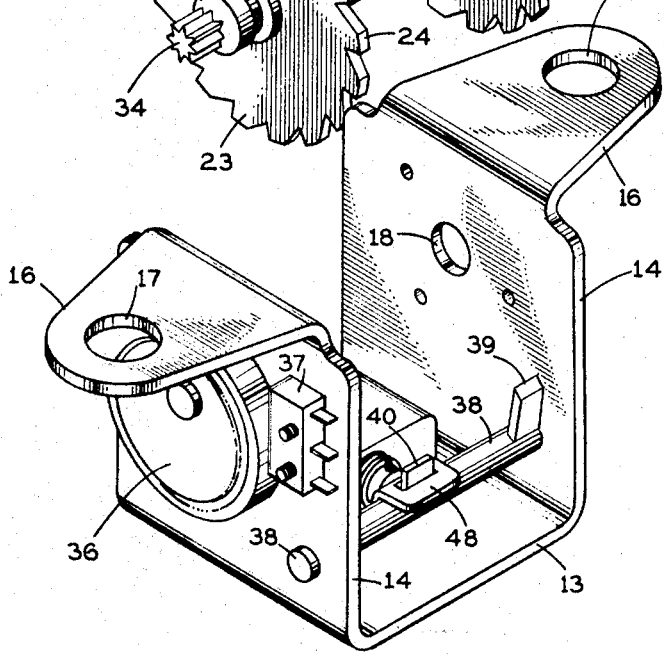
INVENTOR.
TAKEZO TAKADA
BY Stanley Wolder
ATTORNEY

SAFETY BELT MECHANISM

BACKGROUND OF THE INVENTION

The present invention relates generally to improvements in vehicle safety or seat belt mechanisms and it relates particularly to an improved automatic locking vehicle safety belt rewinding reel.

The conventional vehicle safety belt includes a suitably anchored reel about which the belt is wound and which is biased by a rewind spring to a belt retracted condition. In normal use the belt is withdrawn from the reel for its full length and the free end of the belt is coupled by a tongue and buckle arrangement to the opposite side of the seat to secure the occupant in a restrained condition to the seat. The belt is of adjustable length to accommodate occupants of different girths or sizes. The aforesaid conventional safety belt mechanism possesses numerous drawbacks. Among these is the requirement of manually adjusting the length of the seat belt to the size of the respective seat occupant. Another important disadvantage of the conventional seat belt mechanism is that it greatly restricts the movements of the restrained seat occupant during normal operation of the vehicle thereby interferring with the optimum and efficient control of the vehicle by the driver causing a high degree of discomfort.

SUMMARY OF THE INVENTION

It is a principal object of the present invention to provide an improved vehicle safety belt mechanism.

Another object of the present invention is to provide an improved safety belt rewinding reel.

Still another object of the present invention is to provide an improved safety belt rewinding reel which permits the free movement of the seat occupant under normal driving conditions but automatically locks the belt against withdrawal to tightly restrain the occupant in the seat in the event that collision or accident conditions occur, such as a rapid acceleration or deceleration, or an excessive inclination or attitude of the vehicle which results from accidents such as roll over, upending or the like.

A further object of the present invention is to provide a device of the above nature characterized by its reliability, ruggedness, compactness, versatility, adaptability, ease of use and application and the obviation of the need for adjustment to different occupant sizes.

The above and other objects of the present invention will become apparent from a reading of the following description taken in conjunction with the accompanying drawings which illustrate a preferred embodiment thereof.

In a sense the present invention contemplates the provision of an automatic locking safety belt retraction reel mechanism comprising a bracket, a reel rotatably mounted on the bracket, a rewind spring connected to the reel and urging the reel to rotate in a belt retracting first direction and means for releasably locking the reel against rotation in a belt withdrawal second direction including a locking element mounted on the bracket and movable between a reel locking and reel release positions, a solenoid mounted on the bracket, an armature actuated by the solenoid with the energization thereof, and means coupling the armature to the locking element between its release and lock positions with the energization of the solenoid.

In the preferred form of the improved mechanism the bracket includes a base plate and upstanding side plates between which the reel is journalled, ratchets being affixed to opposite ends of the reel proximate the side plate inner faces. A spiral rewind spring has an inner end secured to the reel shaft and an outer end secured to a housing mounted on a bracket side plate. A transverse shaft is rockably supported between the bracket side plates and has radially projecting pawls movable with the rocking of the shaft into and out of engagement with the ratchets and a radially projecting crank arm. A solenoid is mounted on the bracket base plate and actuates an axially movable armature which is connected by a lost motion linkage to the crank arm so that energization of the solenoid actuates the pawls and a spring normally retracts the pawls. The solenoid is connected to a battery through an attitude sensing inertia switch.

The improved automatic locking reel obviates any need for adjusting the safety belt and permits the free movement of the seat occupant. In the event of a collision or accident resulting in a rapid acceleration or deceleration or an inclination of the vehicle beyond a predetermined angle, the reel locks the belt against any withdrawal to safely restrain the seat occupant. The mechanism is reliable, compact and rugged and of great adaptability and versatility.

BRIEF DESCRIPTION OF THE DRAWINGS

FIG. 4 is a sectional view taken along line 4 — 4 in FIG. 1;

FIG. 5 is a left side elevational view, partially broken away, of the reel, and the inertia switch in a switch closed reel locked condition; and FIG. 6 is an exploded perspective view of the reel mechanism.

DESCRIPTION OF THE PREFERRED EMBODIMENT

Figure 1:
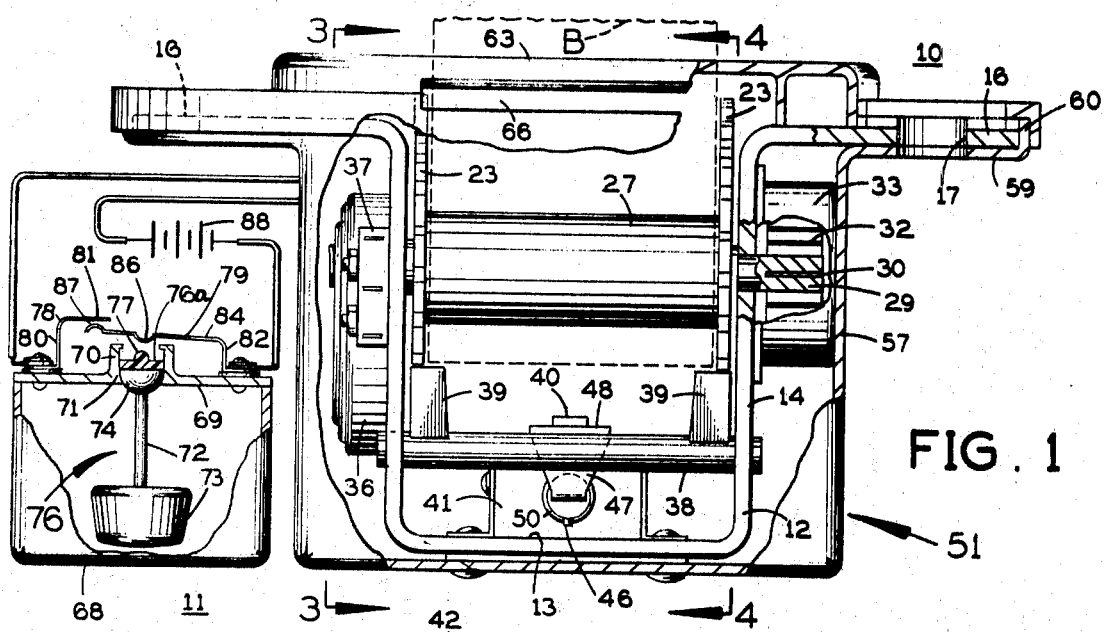
FIG. 1 is a front elevational view, partially broken away, of a reel mechanism embodying the present invention illustrated with the associated inertia switch shown in its normal open position.
Figure 2:
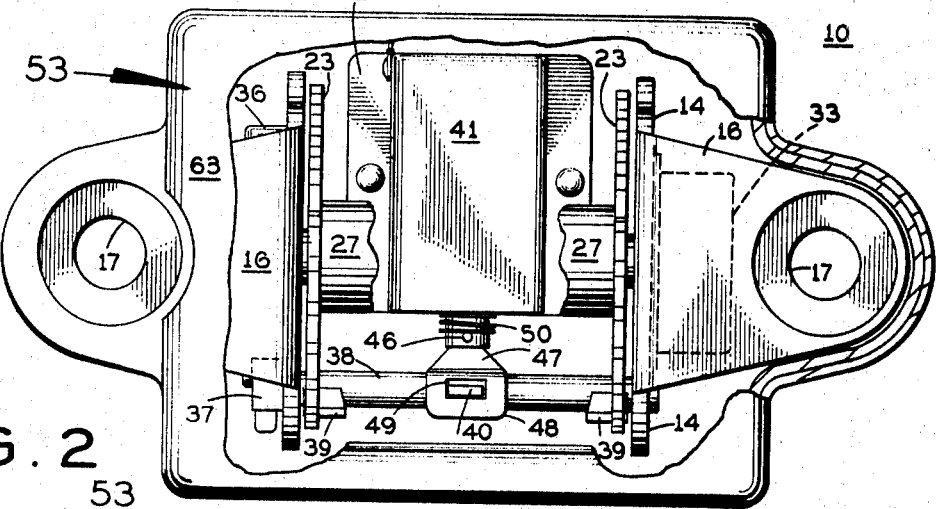
FIG. 2 is a top plan view thereof, partially broken away.
Figure 3:
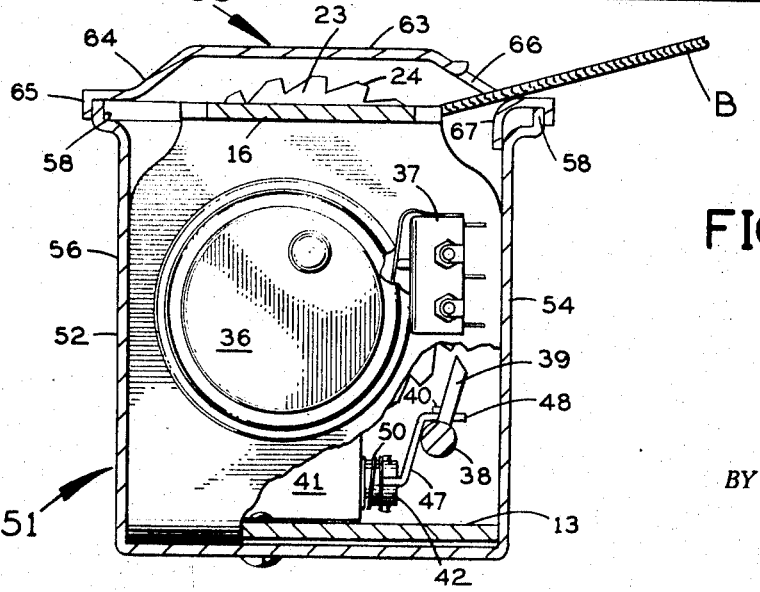
FIG. 3 is a sectional view taken along line 3 — 3 in FIG. 1.

Referring now to the drawings which illustrate a preferred embodiment of the present invention, the reference numeral 10 generally designates the improved automatic locking reel mechanism and 11 the inertia and tilt actuated switch which controls the locking of reel mechanism 10. Reel mechanism 10 comprises a U - shaped mounting bracket 12 including a flat horizontal baseplate 13 and vertical parallel side plates 14 which project from the side edges of base plate 13 and terminate at their tops in outwardly directed ears 16 provided with fastening opening 17. Axially aligned medial openings 18 are formed in the upper part of side plates 14.

A reel 19 extends between and is rotatably supported by side plates 14 and includes a shaft 20 which is journalled at opposite ends by corresponding bushings 21 in dise plate openings 18. Affixed to shaft 20 proximate the inner faces of side walls 14 and spaced therefrom by washers 22 are similar circular ratchets 23 which define the outer flanges of reel 19, the ratchets 23 having peripherally spaces teeth 24 provided with substantially radial shoulders 26 facing in the direction of rotation of reel 19 attendent to the withdrawal of the safety belt. A coaxial hub member 27 surrounds shaft and extends between and is secured to end flanges 27 and is provided with a longitudinal slot 28. A safety belt of known construction is wound on hub 27 and has an inner end extending through slot 28 and suitably attached to shaft 20.

An end 29 of shaft 20 projects beyond a side plate 14 and is provided with a diametric slot 30. A biased spiral wind-up spring 32 surrounds shaft end 29 and has an inner end engaged by and rotatable with slot 30. A cup shaped housing 33 encloses the spring 32 and is positioned on and suitably affixed to the outer face of said wall 14 and the outer end of spring 32 is connected to housing 33 so that rotation of reel 19 upon withdrawal of belt B winds up spring 32. The opposite end of shaft 20 has an integrally formed pinion 34 which meshes with a gear, not shown, located in a side wall mounted housing 36, to actuate a suitably bracket mounted switch 37 in response to the withdrawal of a predetermined length of belt from the reel.

A shaft 38 parallel to shaft 20 is rockably supported by and between side plates 14 proximate the lower front periphery of reel 19. A pair of longitudinally spaced parallel pawl member defining arms 39 having oblique end faces project radially from shaft 38 and are swingable into and out of engagement with ratchets 23 with the rocking of shaft 38. A crank arm 40 projects radially upwardly from shaft 38 intermediate the ends thereof.

An encased longitudinally extending solenoid 41 is mounted atop bracket base plate 13 below reel 19 and is suitably secured to base plate 13 by way of flanges projecting from the bottom of the solenoid housing. Solenoid 41 is provided with an axial bore which is longitudinally slideably engaged by a plunger type cylindrical armature 42 formed of a magnetic material. An angular link member 43 provides a lost motion connection between armature 42 and crank arm 40. Link member 43 includes a horizontal longitudinal bottom leg 44 engaging an end slot in armature 42 and secured thereto by a pin 46 engaged by aligned bores in armature 42 and leg 44 and projecting above and below armature 42, a forwardly upwardly inclined intermidiate leg 47 and a forwardly projecting horizontal top leg 48 of greater width than bottom leg 44. Top leg 48 slideably rests on shaft 38 and has a rectangular opening 49 formed therein which engages crank arm 40. The thickness of crank arm 40 is somewhat less than the corresponding dimension of opening 49 to provide a longitudinal lost motion connection between crank arm 40 and link member 43. A helical spring 50 encircles the outer end of armature 42 and is entrapped between pin 46 and the front face of the solenoid casing to normally urge armature 42 to its outwardly advanced position, as shown in FIG. 4 and 8, in which position link member 43 rocks crank arm 40 and shaft 38 to positions which swing pawls 39 to their unlock positions out of engagement with ratchets 23. Upon energization of solenoid 41, armature 42 is retracted into solenoid 41 against the influence of spring 50 to swing pawls 39 by way of link 43 crank arm 40 and shaft 38 to their reel lock positions in engagement with ratchets 23 as shown in FIG. 5.

The bracket 12 with the various components mounted thereon nests and is housed in a casing 51. Casing 51 comprises a receptacle portion 52 and a cover member 53, the receptacle portion 52 including a rectangular bottom wall, and upstanding rectangular front and rear walls 54 and 56 respectively and side walls 57. Front and rear walls 54 and 56 are provided with upwardly directed lips 58 outwardly offset from the top edges thereof and the side walls 57 are provided at their tops with outwardly projecting, medially apertured ears 59 corresponding in shape to bracket ears 16 and terminating in upwardly directed lips 60. Bracket ears 16 rest on casing ears 59 with their respective medial apertures in axial alignment and bracket base 13 overlies casing bottom wall and substantially coincides therewith.

The cover member 53 is in the form of an inverted dish shaped cap having a flat top wall 63 joined to a downwardly outwardly inclined curved peripheral wall terminating in a depending lip 65 which tightly engages and mates the outer face of the receptacle lips 58 and 60. In order to provide a passageway for belt B from reel 19 a transverse slot 66 of a width greater than that of belt B is formed in the cover forward wall and the forward border of slot 66 is inwardly downwardly curved, as at 67 and the rear border thereof is upwardly forwardly covered. The bracket member 12 with the mounted components and the casing 51 are locked in their assembled condition and desirably mounted by suitable fasteners by way of the apertures formed in ears 16 and 59 and in cover member 53, the cover member 53 being provided with depending ribs bearing on the top faces of bracket ears 16.

The inclination and acceleration responsive switch 11 comprises a housing 68 which is closed by a top lid member 69 provided with an integrally formed centrally positioned upwardly directed open ended cylinder 70. A seat defining inwardly directed peripheral lip 71 is formed about the bottom edge of cylinder 70, the upper face of lip 71 being a spherical surface. A pendulum member 76 includes a vertical rod 72 supporting at its bottom end a heavy weight 73 and terminating at its top in a head 74 with spherical bottom face resting on seat 71 and a flat top face, head 74 and seat 71 defining a ball and socket joint permitting the free swinging of pendulum 76 in any direction. A flat bottomed piston member 76a slideably engages cylinder 70 for free vertical sliding therein and is provided with a centrally located upwardly directed boss 77.

A pair of mutually insulated switch contact members 78 and 79 are mounted in cover plate 69 are in normally open position. Contact member 78 includes a vertical leg 80 provided with a coupling lug 83 at its bottom secured to cover plate 69 and insulated therefrom and terminating at its top in a horizontal leg 81. Contact member 79 includes a vertical leg 82 provided at its bottom with a coupling lug 75 likewise secured to cover plate 69 and insulated therefrom. A horizontal resilient switch arm 84 extends from the upper end of leg 82 diametrically over the top of cylinder 70 to a position directly beneath contact leg 81. A depending first dimple 86 is formed in switch arm 84 in vertical alignment and normally a short distance above boss 77 and a second upwardly directed dimple 87 is formed on the free end of switch arm 84 in vertical alignment with and normally below switch contact leg 81. When pendulum member 76a is swung a predetermined angle from its vertical due to a rapid acceleration or deceleration of switch 11, as shown in FIG. 5, or when the casing 68 is tilted relative to pendulum 76, hemispherical member 74 swings in socket 71 so that its top flat cam surface, as seen in FIG. 5, bears on and raises piston 76a with boss 77 bearing on dimple 86 to raise switch arm 84 into closed contact with contact leg 81 and thereby close normally open switch 11.

One terminal of solenoid 41 is connected either directly or through a manually controlled switch to one terminal of a battery 88, the other terminal of battery 88 being connected to switch lug 75. The other terminal of solenoid 41 is connected to switch lug 83.

In the application and operation of the improved safety belt mechanism the encased reel mechanism 10 is suitably mounted to the vehicle in the known manner in association with a vehicle seat so that the belt B, in cooperation with a suitably positioned and anchored buckling device may be employed as a shoulder belt. The seat occupant withdraws the belt B from reel 19 through opening 66 passes it across his torso and couples the free end thereof to an opposing anchored coupling member. Such withdrawal of the belt permitted by reason of pawls 39 being spring urged out of engagement with ratchets 23 and the belt withdrawal winds spring 32 so that belt B is urged toward its retracted position. The belt engaged occupant is free to move since, as aforesaid, the belt is free to be withdrawn and is only spring urged to a retracted condition.

However, in the event of a rapid acceleration or deceleration of the vehicle or an excessive inclination thereof which characterizes or is the result of an accident or collision, the change in the relative position between pendulum 76 and switch casing 68 closes switch 11, as explained above, to connect battery 88 across solenoid 41 and energize solenoid 41 to thereby retract armature 42. The armature 42 by way of link 43 rocks shaft 38 to swing pawls 39 into locking engagement with ratchets 23 and prevent the rotation of reel 19 and any withdrawal of belt B. The occupant is thus restricted from forward motion and safely restrained to his seat to minimize or prevent injury to the occupant. Upon the vehicle returning to normal, switch 11 opens to deenergize solenoid 41 and permit the spring return of pawls 39 to their ratchet disengage positions.

While there has been described and illustrated a preferred embodiment of the present invention, it is apparent that numerous alterations omissions and additions may be made without departing from the spirit thereof.

What is claimed is:

1. An automatic locking safety belt retraction reel mechanism comprising a bracket including a base plate and a pair of laterally spaced parallel side plates integrally formed with and projecting from opposite edges of and perpendicular to said base plate, a belt accommodative reel extending between and rotatably supported by said side plates, a rewind spring urging said reel to rotate in a belt retracting first direction, a pair of ratchet wheels mounted on and rotatable with said reel and disposed proximate opposite ends of said reel and proximate said side plates, a shaft parallel to and transversely offset from the axis of said reel extending between and journalled to said side plates a pair of parallel pawl elements located at opposite ends of said shaft in registry with respective ratchet wheels and projecting transversely outwardly from said shaft and rockable therewith into and out of engagement with said ratchet wheels, a crank arm located on and projecting transversely outwardly from said shaft, a solenoid mounted on said base plate, an armature movable to a first position and releasable for movement to a second position with the energization and deenergization respectively of said solenoid and coupled to said crank arm to rotate said shaft and rock said pawls into engagement with said ratchet wheels upon energization of said solenoid and the movement of said armature to its first position, means including a normally open inertia switch for connecting said solenoid to a source of current, and spring means biasing said armature to its second position and said pawl elements out of engagement with said ratchet wheels.

2. The mechanism of claim 1 comprising a link interconnecting said armature and crank arm to rock said crank arm and shaft with the energization of said solenoid.

3. The mechanism of claim 2, wherein said link has an opening formed therein engaged by said crank arm, said opening being of greater dimension in the direction of movement thereof than said crank arm to provide a lost motion coupling between said armature and said crank arm.

4. The mechanism of claim 2, including a casing housing said bracket and reel and having an opening in the top wall thereof providing a passageway for a belt extending from said reel.

* * * * *

UNITED STATES PATENT OFFICE
CERTIFICATE OF CORRECTION

Patent No. 3,740,000  Dated June 19, 1973

Inventor(s) TAKEZO TAKADA

It is certified that error appears in the above-identified patent and that said Letters Patent are hereby corrected as shown below:

--30 Foreign Application Priority Data

Japan July 14, 1970.....................45-069730

Signed and sealed this 22nd day of January 1974.

(SEAL)
Attest:

EDWARD M. FLETCHER, JR.
Attesting Officer

RENE D. TEGTMEYER
Acting Commissioner of Patents